J. Rowe.
Excavator.
N° 602. Patented Feb. 18, 1838.
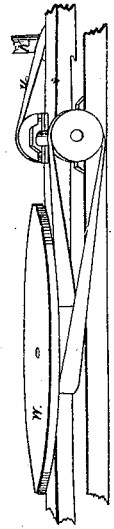
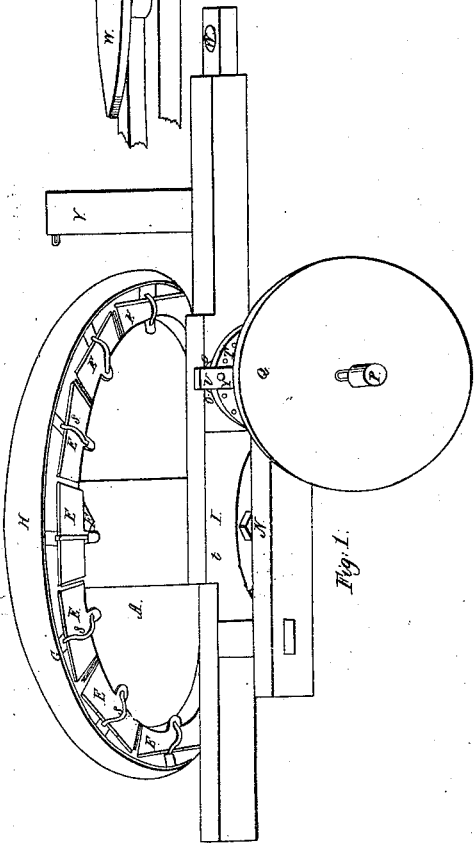
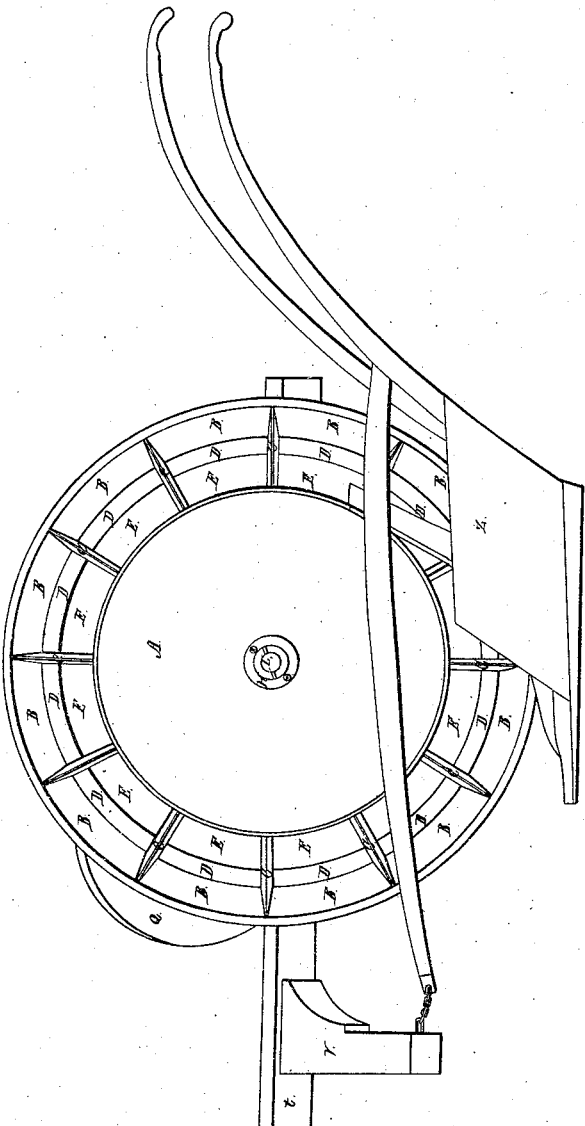
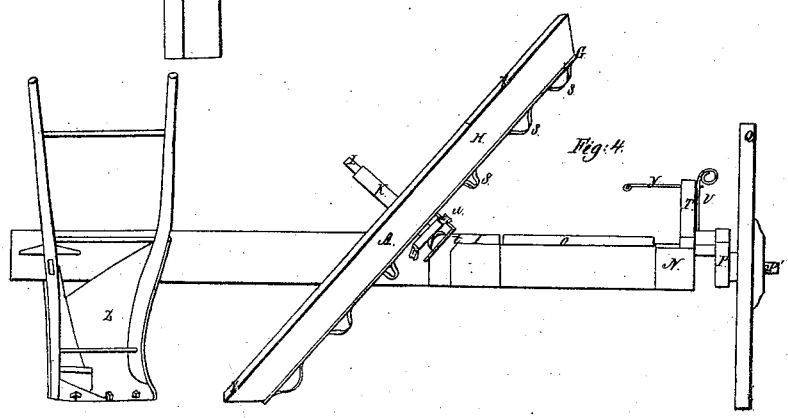
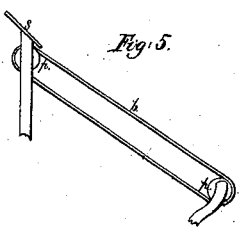

UNITED STATES PATENT OFFICE.

JAMES ROWE, OF TRIANA, ALABAMA.

INCLINED ELEVATING BOX-WHEEL FOR EXCAVATING EARTH.

Specification of Letters Patent No. 602, dated February 15, 1838.

*To all whom it may concern:*

Be it known that I, JAMES ROWE, of Triana, in the county of Madison and State of Alabama, have invented a new and useful Improvement in Machines for Excavating Earth, called "Rowe's Inclined Elevating Box-Wheel," which is described as follows, reference being had to the annexed drawings of the same, making part of this specification.

My machine consists of a large elevating wheel A, Figures 1, 3 and 4 inclined at an angle of about fifty degrees, with buckets B, Fig. 3 on its periphery to receive the earth turned into them by a common plow Z Fig. 3 attached to the machine—said wheel, called the box-wheel, turning on a spindle L, Figs. 3 and 4, inserted into the side of a rectangular frame which is elevated from the ground on one side by said box wheel and on the other by a vertical wheel Q, turning on a crank axle on the off side of the frame I, (Fig. 1)—said frame with the wheels being drawn forward by a locomotive engine to which it is attached, or by animals attached to it—the plow, which may be of the common bar-share kind being attached to the forward part of the frame on the near side or toward the face of the box wheel for turning the earth to be raised, into the buckets B, (Fig. 3) of said box-wheel—or the plow may be such as seen at L Fig. 3, a part of the bottom of said buckets E, (Fig. 1) being movable on hinges for discharging their loads when required and kept closed, while being filled by springs S, on the back of the same and during their revolution and when they arrive at the vertex of the curve in which they move are opened by a stationary inclined plane F, fastened to the frame against which, arms, attached to and projecting from the movable bottoms of the buckets, (with or without anti-friction rollers) come in contact causing them to open and discharge their load through the openings which they close or cover,—at the same time contracting the springs; which, as soon as the arms have passed the inclined plane, again close the movable bottoms by their elastic power;—the earth being discharged into any suitable receiver placed under them, or on to an endless conveying-band, moving over rollers or drums, in the ordinary mode which conveys the earth to a cart, or any other place desired, by means of a connection by band or otherwise with the hub of the inclined wheel;—or the earth may be discharged upon my patented circular revolving pleasure car—the seats being previously removed to give room for the earth or by means of a circular revolving platform such as is represented at Fig. 2; and when excavating in uneven places having the axle P, Figs. 1, 4, of the vertical wheel so arranged on a crank moving around on an adjusting semi-circular plate T, that the frame and box wheel may be adjusted to any required angle, by means of an arm U, and pin or key Y.

A, Figs. 1, 4, 3, in the annexed drawings represents the inclined box wheel which may be made of cast-iron, or any suitable material; its size will necessarily vary according to the purposes to which it is applied.

The boxes or buckets B (Fig. 3,) to receive the earth are formed around the periphery of said box wheel the partitions C being at regular intervals of about two feet more or less, and the depth and width of the buckets or boxes; may be about equal. The partitions are brought to a sharp edge in part as at C Fig. 3 in order to cut the sod or clay as it comes from the plow to admit the earth to pass into the chamber of each box as the wheel revolves.

The boxes B Fig. 3 are closed or made solid a little more than half their length as at D, and the remaining part of the box B, is closed by a movable shutter E either hinged or sliding, with a catch or spring S, to hold it closed as at S, Figs. 1 and 4, and a stationary double-inclined plane F Fig. 1 is fastened to the frame to open them, when each bucket arrives at the point of greatest altitude;—the earth then escapes.

A small rim G, Figs. 1 and 4, projects outward beyond the face of the buckets to receive pins or spikes, if necessary, to sink into the ground to prevent the box-wheel from sliding or slipping around on the ground when loaded. From this small rim projects a wide splayed rim H, 18 in. wide more or less, so as to lay flat on the ground on a level when the box wheel is hung at an angle of about 50 degrees. This inclined box wheel is attached to any kind of simple framing made for the purpose, such as I, to be attached to a locomotive engine, or to the axle-tree of a wagon, and hung at the aforesaid angle. It has projecting centers or hubs K, Figs. 3 and 4, on each side of the box wheel to admit the spindle L, through a round aperture in the center of the same hub and of sufficient diameter to give the requisite motion to any convenient conveying apparatus—by a connecting band—part of which is seen at $u$ Fig. 4 and $u$ Fig. 2—such for instance as is represented at Figs. 2 and 5, and which will receive the earth from said inclined box wheel and convey and deposit it where required.

The excavator, or plow proposed to be used is the farmer's common bar-share-plow, with very little change and variation although any suitable kind of plow may be used. The plow, however, should be built longer, and so constructed as to raise the earth more gradually, and a little higher before it is turned over by the mold-board the beam may be larger and so constructed as to work from 4 to 8, colters abreast, when necessary, so as to cut up the sod or tough clay, in order to facilitate its discharge from the boxes. The plow is to be attached to the framing of the box wheel and in a position to work immediately by the side of the boxes of the inclined wheel so as to turn the earth into them with facility. In front of the boxes of the box wheel is a narrow rim set obliquely—see Figs. 3 and 4.

Operation: Everything being properly arranged the locomotive or team moves forward—the plow turns the furrow or furrows over a small rim X Figs. 3 and 4 in front of the boxes of the inclined wheel into them. The traveling or onward motion of the box wheel elevates the earth to the apex of the curve in which it moves. The stationary fixture or double inclined plane opens the gates, doors, or shutters, and the discharges take place at one point, by means of the arms coming in contact with said inclined plane. A chute constructed to receive the earth and convey it to one point is recommended to be used. And by means of simple fixtures well known to mechanics the earth may be conveyed to the right or left any distance required for the construction of roads, streets, &c. The before described box wheel may be attached to the necessary framing of the machine, as one of the traveling wheels, or it may be appended as an extra.

A simple mode of constructing the frame is by having a strong, straight beam of timber $t$, Figs. 3 and 4. About the center of this timber the box wheel is hung on a strong axle L, Figs. 3 and 4. On the opposite side of this timber $t$, from the box wheel there is framed a parallel piece N, (Fig. 1) and on the front end of the frame is a shaft O, Figs. 1 and 4, and on the end of said shaft immediately outside the frame the shaft turns at right angles and then again at right angles and forms a crank P, Fig. 4, the last mentioned turn being formed into a spindle P', on which wheel Q is placed, designed to balance the box wheel and support the opposite side of the frame from that on which the inclined wheel is placed. On the shaft is fastened a right-angled arm U moving against a semi-circular plate T (the side view shown in Fig. 4, and the front view in Fig. 1,) pierced with apertures and fastened to the frame, said arm being pierced with corresponding holes through which a key Y, is inserted to fasten it at any angle required, in order to raise or lower the side of the frame for changing the inclination of the box wheel. In front of the wheel there is a strong arm V, Figs. 1 and 3, connected to the main beam, to which arm the plow is fastened or attached. The end of the main beam is tenoned as at W (Fig. 1) likewise pierced with a hole to attach it to the axle of the front wheels of a common wagon.

*Manner of using the machine.*—For the various kinds of ditching, and the formation of a levee, no appendage is necessary to the inclined box wheel, except a simple chute $s$, Fig. 5, to convey the dirt to the levee. If the excavated earth is designed to be moved, the only appendage necessary in addition to what is described is a wide belt $b$, formed on any of the endless chain plans passing around two pulleys $p$, $p$, and motion given from the hub at the center of the box wheel by a continuation of the band in Fig. 4, or it will revolve from the gravity of the earth, and the left end of the belt is sufficiently elevated for dirt and wagons to pass under and receive the earth. Or by lengthening the belt the dirt may be conveyed from the side cut to the center of a street or road, or a large horizontal wheel $w$, Fig. 2, may be hung on an axle and motion given to it, as before described, by placing this wheel below or on a line with the center of the box-wheel; then, by means of an inclined apron collect the dirt on this wheel, and by its motion it is carried around and by a stationary fixture it is pushed off at any point desired. On this plan the box-wheel will do a fair business without the use of the doors and springs, which may be wholly dispensed with. By this machine and fixtures carts and wagons may be filled with astonishing facility wherever the plow and cart can be worked, and as much earth can be thrown up by a single team and two hands as by fifty hands in the ordinary mode.

For plowing both ways and forming an embankment on one side only, I recommend my circular rail-road and continuous car to be mounted on the framing of the excavating machine and to be driven by a band leading to the hub of the box wheel.

By dispensing with the seats of the car it may be made an efficient agent to convey the dirt to an embankment.

The advantages of my improvement over others of the kind are: 1. It receives the earth directly from the plow almost entirely without waste and elevates it to any convenient height, and delivers it without waste to other agents such as are represented at Figs. 2 and 5, by which it is conveyed and deposited into carts, as from the side ditches of streets, or roads to the center, or from the center of canals, forming embankments on each or either side. 2. From the simplicity of the machine it is not subject to derangement; and its cost will be comparatively small.

The invention claimed by me, the said JAMES ROWE, and which I desire to secure by Letters Patent, consists—

1. In the above described mode of constructing the revolving box wheel.
2. The method of opening the shutters of the boxes by the double inclined plane for the discharge of the earth.
3. The method of adjusting the frame and box wheel by the crank, arm, and semicircle, together with the combinations and arrangement of these parts, substantially in the manner above described.

JAMES ROWE.

Witnesses:
 IRA E. HOBBS,
 ELLIOTT W. HILLIARD.